(12) United States Patent
Guillez et al.

(10) Patent No.: US 7,240,953 B2  
(45) Date of Patent: Jul. 10, 2007

(54) LOCK SYSTEM FOR A CONVERTIBLE VEHICLE ROOF

(75) Inventors: Jean-Marc Guillez, Cirieres (FR); Gérard Queveau, Le Pin (FR); Paul Queveau, Montravers (FR)

(73) Assignee: SEBA, Paris (FR)

( * ) Notice: Subject to any disclaimer, the term of this patent is extended or adjusted under 35 U.S.C. 154(b) by 89 days.

(21) Appl. No.: 10/525,698

(22) PCT Filed: Feb. 24, 2004

(86) PCT No.: PCT/FR2004/000414

§ 371 (c)(1), (2), (4) Date: Feb. 22, 2005

(87) PCT Pub. No.: WO2004/078521

PCT Pub. Date: Sep. 16, 2004

(65) Prior Publication Data

US 2005/0242617 A1    Nov. 3, 2005

(30) Foreign Application Priority Data

Feb. 28, 2003 (FR) ................................. 03 02487

(51) Int. Cl.  
*B60J 7/12* (2006.01)

(52) U.S. Cl. ..................................................... 296/121
(58) Field of Classification Search ............... 296/121, 296/224; 292/DIG. 5  
See application file for complete search history.

(56) References Cited

FOREIGN PATENT DOCUMENTS

FR          2 820 692         2/2001

*Primary Examiner*—Joseph D. Pape  
(74) *Attorney, Agent, or Firm*—Nawrocki, Rooney & Sivertson, P.A.

(57) ABSTRACT

The invention relates to a convertible roof for a vehicle. More specifically, the invention relates to locking means comprising a traveller which is mounted in a guide rail that is solidly connected to a roof element. The system also comprises: first elastomeric means which are designed to return the aforementioned traveller to an unlocked position; push means which are controlled by the translational movement of a bolt which is mounted to a threaded part of a rod, in order to push the traveller into a locked position against the force of said first elastic means; and at least one locking pin which is mounted to the traveller or the guide rail, such as to co-operate with a complementary locking member when the traveller is in the locked position, said complementary locking member being solidly connected to an adjacent roof element or to the front or rear of the vehicle body.

4 Claims, 2 Drawing Sheets

LOCK SYSTEM FOR A CONVERTIBLE VEHICLE ROOF

BACKGROUND OF THE INVENTION

The invention relates to a retractable roof for a vehicle, the retractable roof being made up of a plurality of rigid roof elements that are movable between a position in which they cover the passenger compartment of the vehicle and a position in which they are stowed inside the rear trunk of the vehicle.

Such a retractable roof makes it possible to transform a vehicle of the sedan/saloon type or of the coupe type into a vehicle of the convertible/cabriolet type.

It is known, in particular from Document FR A 2 820 692, that a retractable roof for a vehicle can be made up of a plurality of rigid roof elements that are movable between a position in which they cover the passenger compartment of the vehicle and a position in which they are stowed inside the rear trunk of the vehicle, said roof elements being connected together and to the front and rear portions of the bodywork by locking means when they cover the passenger compartment, said locking means being controlled by a first rod driven in rotation by an electric motor, the first rod and the motor being received in a roof element.

In that document the motor drives the locking elements positively both during unlocking and during locking. That motor must therefore be of relatively high power.

SUMMARY OF THE INVENTION

An object of the invention is to mitigate that drawback.

To this end, the invention provides a retractable roof for a vehicle, the retractable roof being made up of a plurality of rigid roof elements that are movable between a position in which they cover the passenger compartment of the vehicle and a position in which they are stowed inside the rear trunk of the vehicle, said roof elements being connected together and to the front and rear portions of the bodywork by locking means when they cover the passenger compartment, said locking means being controlled by a first rod driven in rotation by an electric motor, the first rod and the motor being received in a roof element, said retractable roof being characterized by the fact that, for at least one roof element, the locking means comprise a slide rail mounted in a slideway rail that is secured to said roof element, first resilient means suitable for urging said slide rail into an unlocking position, thrust means controlled by the movement in translation of a nut mounted on a threaded portion of said first rod and for pushing said slide rail into a locking position against the drive from the first resilient means, and at least one locking finger mounted on said slide rail or on said slideway rail and for co-operating with a complementary locking member that is secured to an adjacent roof element or to the front portion of the bodywork or to the rear portion of said bodywork, when the slide rail is in its locking position.

Thus, the motor serves only to perform the locking, against the drive from the resilient means. Unlocking is achieved by said resilient means.

In a particular embodiment of the invention, said locking finger is pivotally mounted on said slideway rail to pivot between a locking position and an unlocking position, resilient means being arranged to urge the locking finger into its unlocking position, and thrust means secured to the slide rail being arranged to bring the locking finger into its locking position when the slide rail is itself brought into its own locking position.

In another embodiment, said locking finger is mounted on said slide in fixed manner so that it cannot pivot relative thereto.

When the roof is made up of at least three elements, the slide rail of a first roof element is connected to the slide rail of a second roof element via at least one thrust rod.

BRIEF DESCRIPTION OF THE DRAWINGS

A particular embodiment of the invention is described below by way of non-limiting example and with reference to the accompanying drawings, in which.

DETAILED DESCRIPTION OF THE INVENTION

Figure 1:
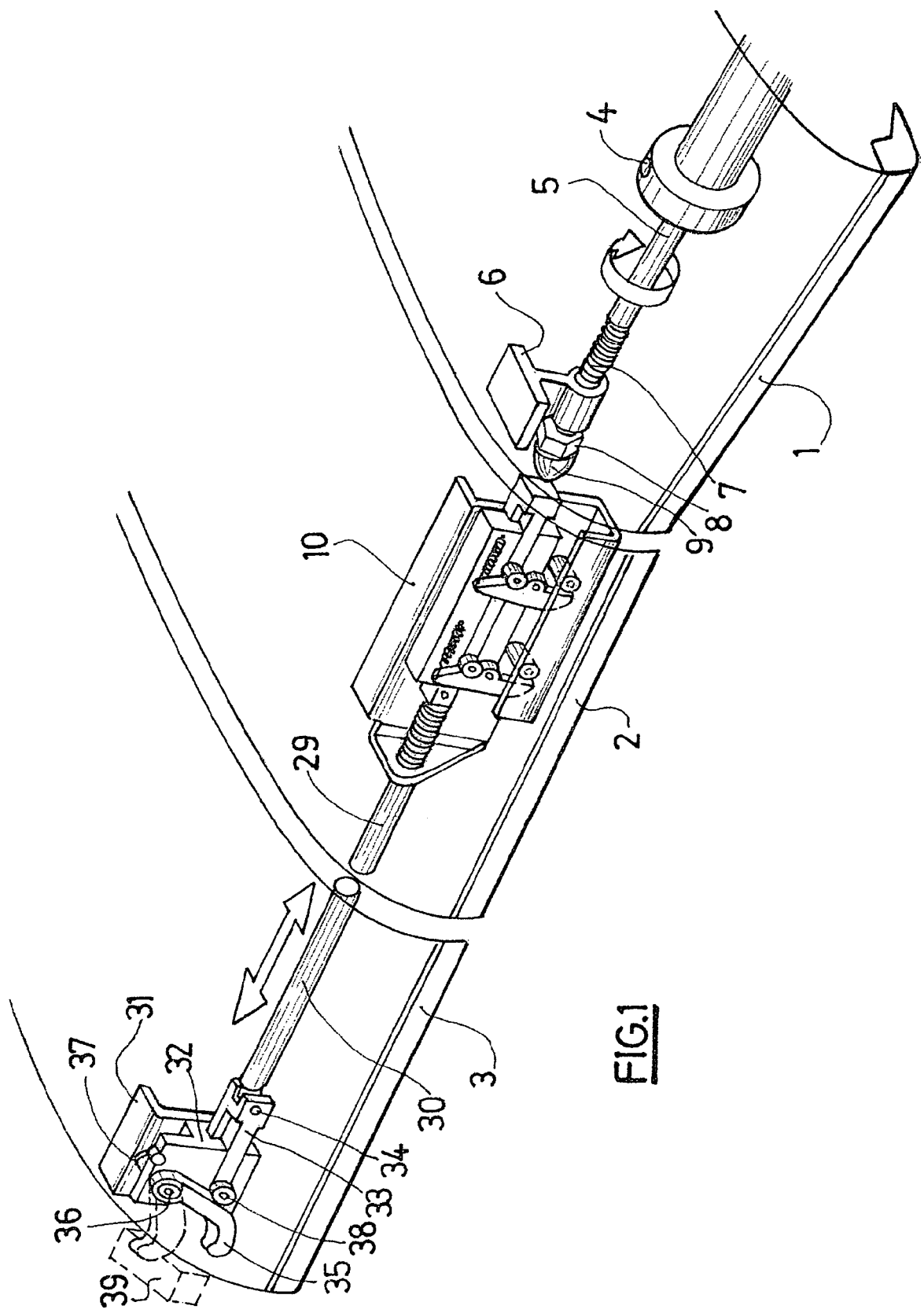
FIG. 1 is a perspective view of a locking system of the present invention.

FIG. 1 shows a retractable roof of a motor vehicle. This roof is made up of a rear element 1, of an intermediate element 2, and of a front element 3. Said roof is retractable from a position in which it covers the passenger compartment of the vehicle to a position in which it is stowed inside the rear trunk, it being caused to go from one position to the other by any known means.

An electric motor 4 is received in the rear element 1 and it drives in rotation a rod 5 that is mounted on its outlet shaft. The rod 5 is guided by a bearing 6 that is secured to the rear element, and said rod is provided with a thread 7 on its end. Said thread co-operates with a nut 8 that is guided in translation and that is secured to a thrust finger 9.

Figure 2:
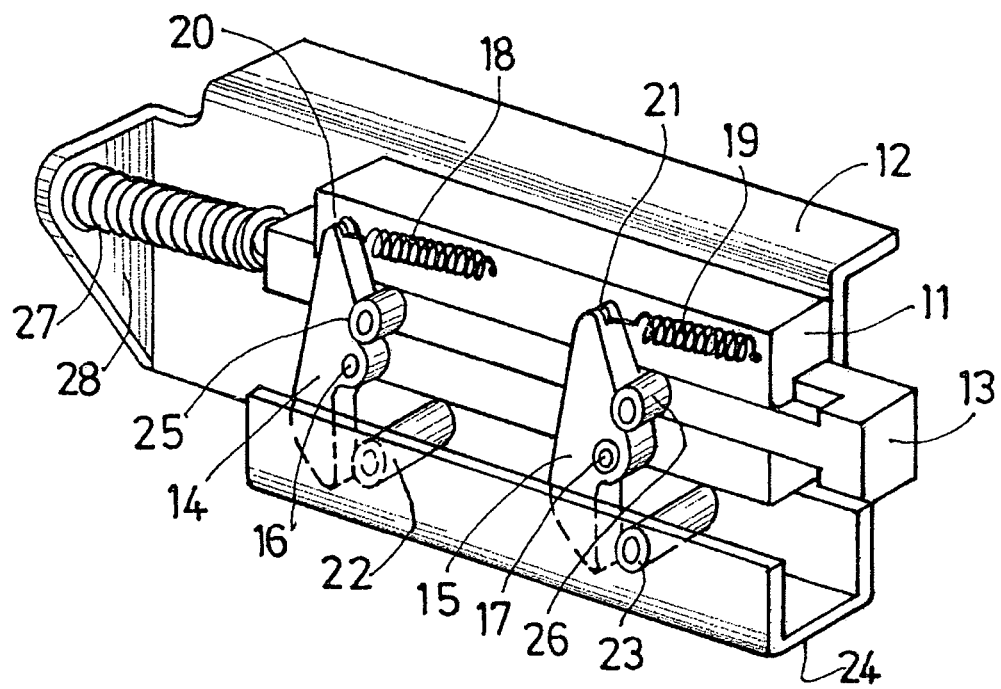
FIG. 2 is a perspective view on a larger scale of a member shown in FIG. 1.

A first locking unit 10 shown in more detail in FIG. 2 is mounted in the intermediate roof element 2.

The unit 10 includes a slideway rail 11 fixed in the element 2 by a bracket 12. A slide rail 13 of shape complementary to the shape of a groove formed in the slideway rail 11 is slidably supported by said slideway rail so that it can slide in the longitudinal direction of the vehicle.

Two locking fingers 14 and 15 are mounted on the slideway rail 11 via pins 16 and 17. The locking fingers 14 and 15 are in the form of levers that are substantially vertical and whose top portions are urged rearwards by springs 18 and 19 each of which is fixed at one end to the slideway rail 11 and at its other end to the top end 20, 21 of the respective one of the fingers 14, 15.

The bottom portions of the fingers 14 and 15 can engage against respective locking members 22, 23 that are secured to the rear roof element. In this example, said locking members 22, 23 are tubular segments that are mounted between the flanges of a channel-section member 24 fixed to the front of the rear roof element 1.

Thrust studs 25, 26 are mounted on the slide 13 for pushing the top portions of the fingers 14, 15 forwards against the drive from the springs 18, 19, thereby bringing the bottom portions of the fingers 14, 15 into locking contact with the members 22, 23 when the slide rail 13 is brought forwards into the locking position by the thrust finger 9.

A compression spring 27 is mounted between the front end of the slide rail 13 and a projection 28 on the bracket 12 so as to urge the slide rail 13 backwards.

A rod 29 passes through the projection 28 and the spring 27 so that its rear end is in abutment against the slideway rail 13. When the roof is in its closed position, the front end of the rod 29 comes into register with and substantially into contact with the rear end of a rod 30 mounted in the front roof element 3.

Said front roof element 3 also receives a slideway rail 32 via a bracket 31, and a slide rail 33 is mounted in said slideway rail. The rear portion of the slide rail 33 is fixed by means of a pin 34 to the front portion of the rod 30.

A locking finger 35 is pivotally mounted on the slideway rail 32 to pivot about a transverse pin 36. The locking finger 35 is urged rearwards by a spring 37 mounted on the pin 36, and can be pushed forwards by a locking stud 38 secured to the slide rail 33. In its front position (shown in dashed lines), the locking finger 35 is engaged in a locking member 39 that is secured to the structure of the vehicle.

Thus, when the rod 5 is driven in rotation by the motor 4, the thrust finger 9 pushes the slide rail 13 forwards so that the thrust studs 25 and 26 cause the locking fingers 14 and 15 to tilt so that they lock the intermediate roof element onto the members 22 and 23 and therefore onto the structure of the vehicle. In addition, the slide rail 13 pushes the rods 29 and 30 so that the thrust stud 38 brings the locking finger 35 to lock the front roof element 3.

When the motor is driven in the other direction, the thrust finger 9 is withdrawn and the springs 27 and 37 bring the locking fingers into a non-locking position, thereby releasing the intermediate and the front elements 2 and 3.

Figure 3:
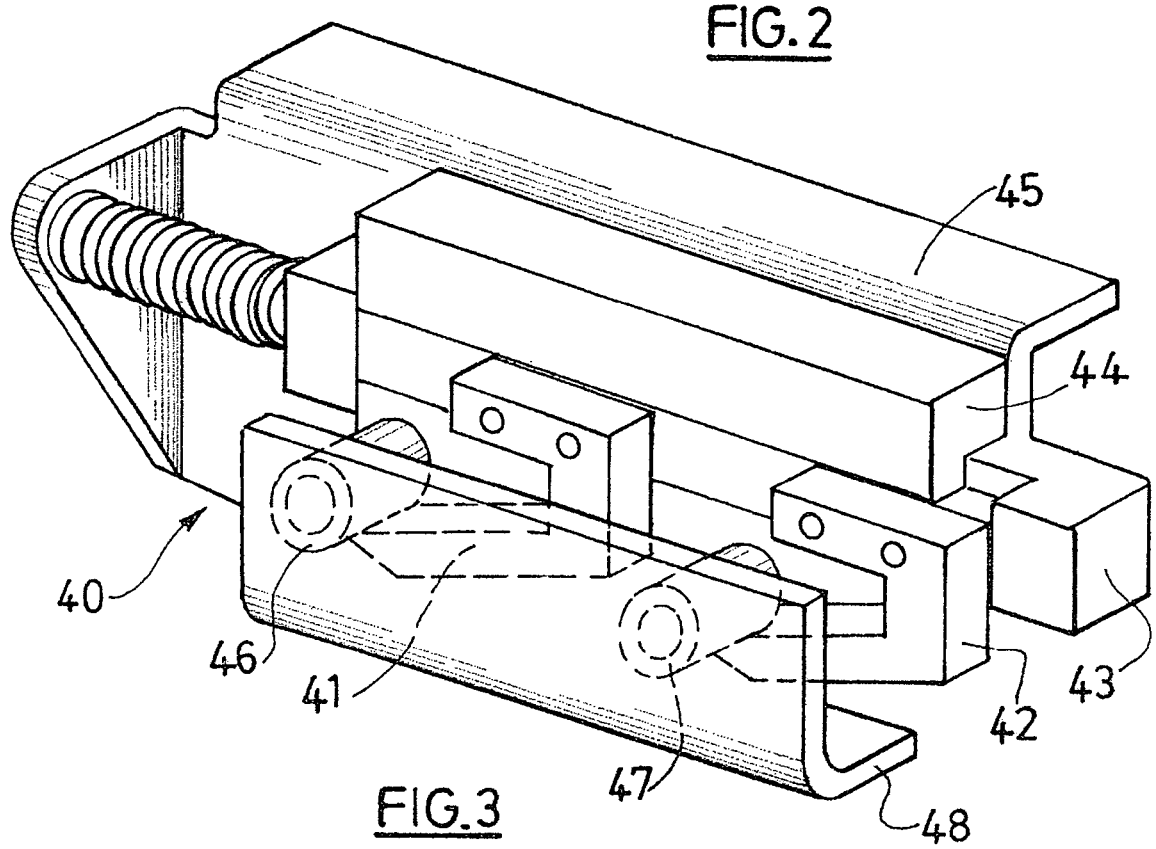
FIG. 3 is a perspective view of another embodiment of the member shown in FIG. 2.

In the embodiment shown in FIG. 3, instead of carrying pivotally mounted locking fingers like the fingers 14 and 15, the locking unit 40 carries two stationary fingers 41 and 42 that are hook-shaped and that are mounted on the slide rail 43 which is slidably mounted in a slideway rail 44 that is fixed to the roof element via a bracket 45. The fingers 41 and 42 are suitable for co-operating with locking members 46 and 47 that are mounted on an angle member 48 secured to the structure of the vehicle.

When the slide rail 43 is pushed forwards by the thrust finger 9 against the drive from a spring 49, the fingers 41 and 42 engage against the locking members 46 and 47, thereby locking the element 2.

The invention claimed is:

1. A retractable roof for a vehicle comprising rigid roof elements having locking means for locking the elements together, when by said locking means for locking the elements together being controlled by a first rod driven in rotation by an electric motor, the locking means comprising a slide rail mounted in a slideway rail, first resilient means suitable for urging said slide rail into an unlocking position, thrust means controlled by the movement in translation of a nut mounted on a threaded portion of said first rod and for pushing said slide rail into a locking position against a drive from the first resilient means, and at least one locking finger mounted on said slide rail co-operating with a complementary locking member.

2. A retractable roof according to claim 1, in which said locking finger is pivotally mounted on said slideway rail to pivot between a locking position and an unlocking position, resilient means being arranged to urge the locking finger into its unlocking position, and thrust means secured to the slide rail being arranged to bring the locking finger into its locking position when the slide rail is itself brought into its own locking position.

3. A retractable roof according to claim 1, in which said locking finger is fixed to said slide.

4. A retractable roof according to claim 1, in which a slide rail of a first roof element is connected to the slide rail of a second roof element via at least one thrust rod.

* * * * *